(12) United States Patent
Wang He

(10) Patent No.: US 9,157,601 B2
(45) Date of Patent: Oct. 13, 2015

(54) LENS UNIT AND LIGHT SOURCE MODULE WITH SAME

(71) Applicant: HON HAI PRECISION INDUSTRY CO., LTD., New Taipei (TW)

(72) Inventor: Li-Ying Wang He, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 3 days.

(21) Appl. No.: 14/054,842

(22) Filed: Oct. 16, 2013

(65) Prior Publication Data

US 2015/0029722 A1    Jan. 29, 2015

(30) Foreign Application Priority Data

Jul. 26, 2013   (TW) .............................. 102126867 A

(51) Int. Cl.
*F21V 5/00* (2015.01)
*F21V 5/04* (2006.01)
*G02B 19/00* (2006.01)
*F21Y 101/02* (2006.01)

(52) U.S. Cl.
CPC ................. *F21V 5/008* (2013.01); *F21V 5/043* (2013.01); *G02B 19/0009* (2013.01); *G02B 19/0061* (2013.01); *F21Y 2101/02* (2013.01)

(58) Field of Classification Search
CPC ............. F21V 5/00; F21V 5/04; F21V 5/008; F21V 5/007; F21V 5/048; F21V 5/043; F21K 9/58; F21K 9/56; F21K 99/00; G02B 3/00; G02B 13/003; G02B 19/0061; G02B 19/0009; F21Y 2101/02
See application file for complete search history.

(56) References Cited

U.S. PATENT DOCUMENTS

| 7,348,723 | B2 * | 3/2008 | Yamaguchi et al. | 313/501 |
| 7,554,752 | B2 * | 6/2009 | Tamaoki et al. | 359/726 |
| 2011/0255290 | A1 * | 10/2011 | Kazmierski et al. | 362/296.05 |
| 2013/0188257 | A1 * | 7/2013 | Cho et al. | 359/627 |
| 2014/0056006 | A1 * | 2/2014 | Jongewaard et al. | 362/296.01 |

* cited by examiner

*Primary Examiner* — Bao Q Truong
(74) *Attorney, Agent, or Firm* — Novak Druce Connolly Bove + Quigg LLP

(57) ABSTRACT

The present disclose relates to a lens unit. The lens unit includes a first lens and a second lens. The first lens includes a first light input surface, a first light output surface opposite to the first light input surface and a first side surface connected to the first light output surface. The first lens has a first refractive index. The second lens defines a cavity at a light input surface thereof for receiving the first lens. The second light output surface of the second lens contacts the first light output surface and the first side surface of the first lens. The second lens has a second refractive index which less than the first refractive index. The present disclose also relates to a light source module with the lens unit.

16 Claims, 6 Drawing Sheets

LENS UNIT AND LIGHT SOURCE MODULE WITH SAME

BACKGROUND

1. Technical Field

The disclosure relates to a lens unit and a light source module with the lens unit.

2. Discussion of Related Art

Light emitting diodes (LEDs) with many advantages, such as high luminosity, low operational voltage, low power consumption, compatibility with integrated circuits, faster switching, long term reliability, and environmental friendliness have promoted their wide use as a lighting source.

However, the conventional LED cannot have a wide illumination area even use with a diverging lens. The light having a large incidence angle on the light emerging face of the diverging lens, may be totally reflected backwardly into the diverging lens. Thus, the radiation angle of the light emitted out of the diverging lens is limited, generally less than 120 degrees. In other words, the light intensity dramatically decreases when the radiation angle exceeds 120 degrees.

Therefore, what is needed is a lens unit and a light source module with the lens which can overcome the described limitations.

BRIEF DESCRIPTION OF THE DRAWINGS

Many aspects of the disclosure can be better understood with reference to the following drawing. The components in the drawing are not necessarily drawn to scale, the emphasis instead being placed upon clearly illustrating the principles of the present the lens unit and the light source module for microminiaturization. Moreover, in the drawing, like reference numerals designate corresponding parts throughout the whole view.

DETAILED DESCRIPTION OF EMBODIMENTS

Figure 1:
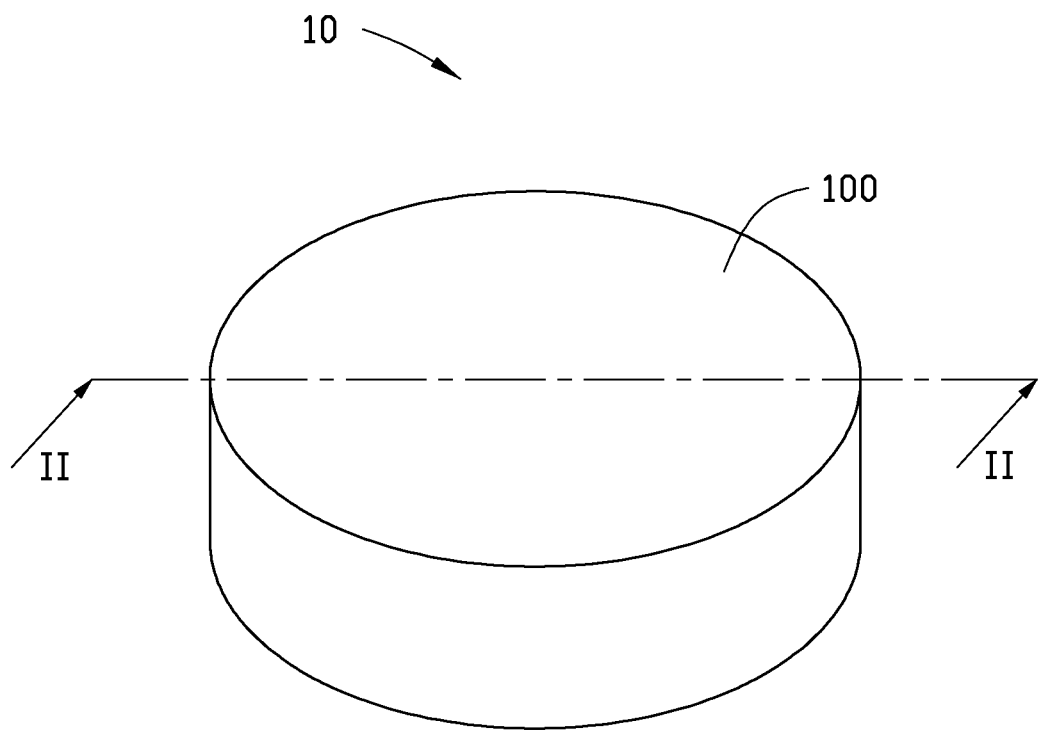
FIG. 1 is a schematic, isometric view of a light source module according to an exemplary embodiment.
Figure 2:
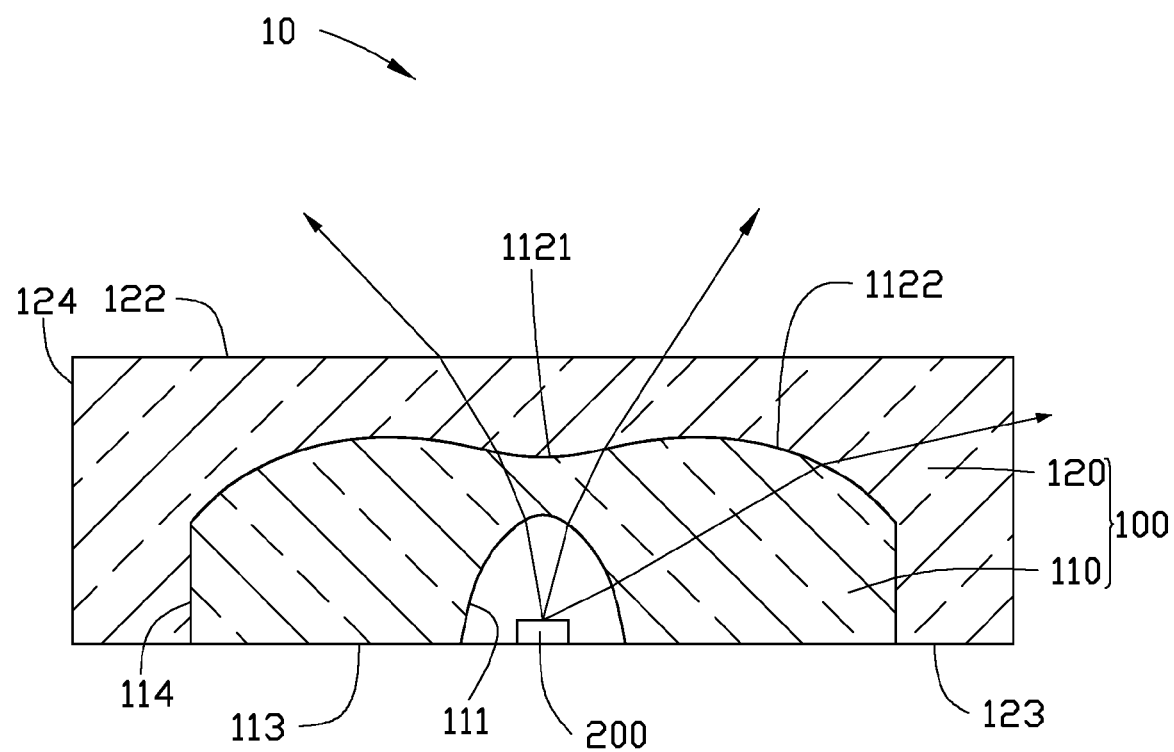
FIG. 2 is a cross-sectional view of the light source module of FIG. 1, taken along line II-II thereof.
Figure 3:
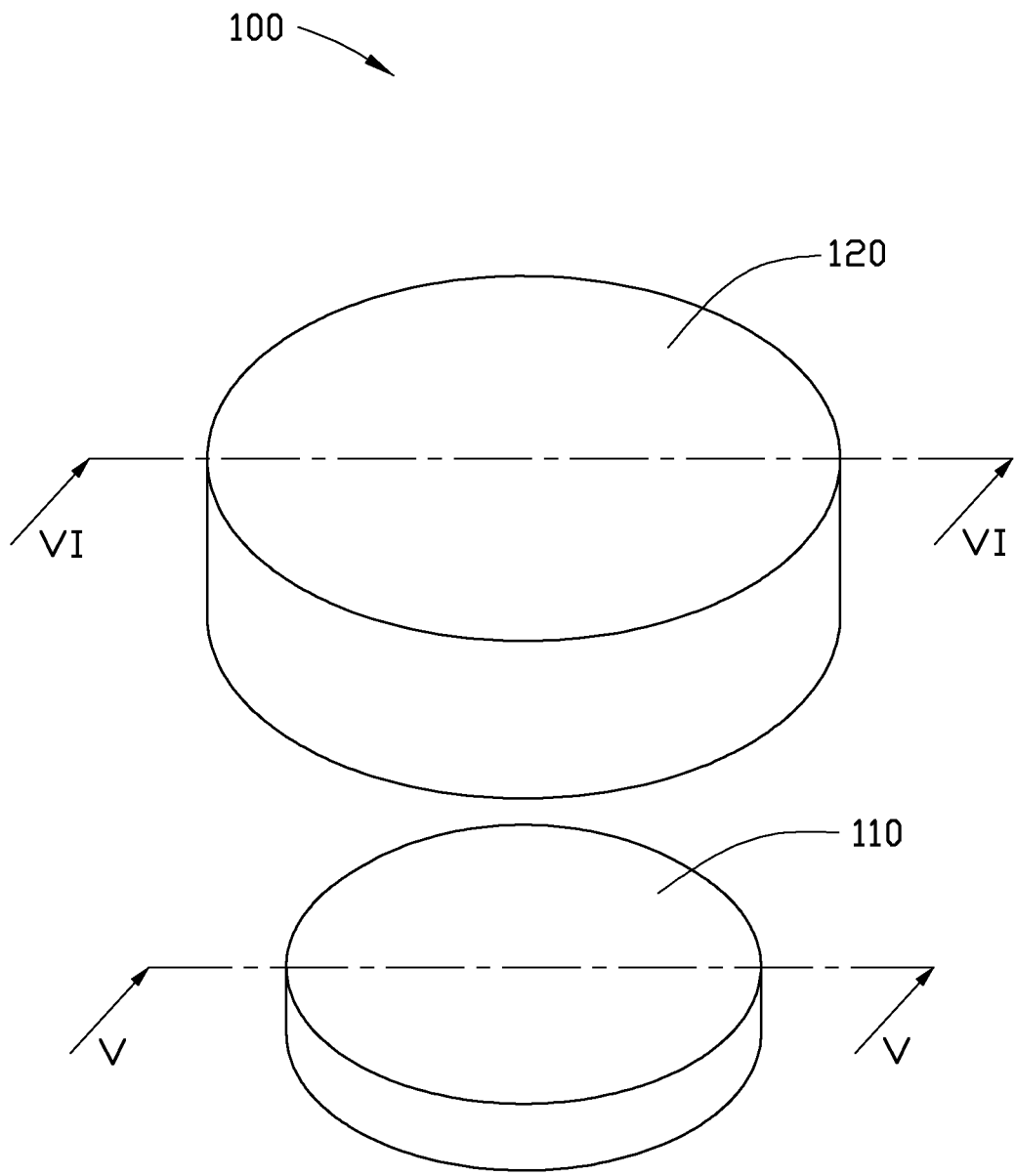
FIG. 3 is a disassembled view of a lens unit of the light source module of FIG. 1.
Figure 4:
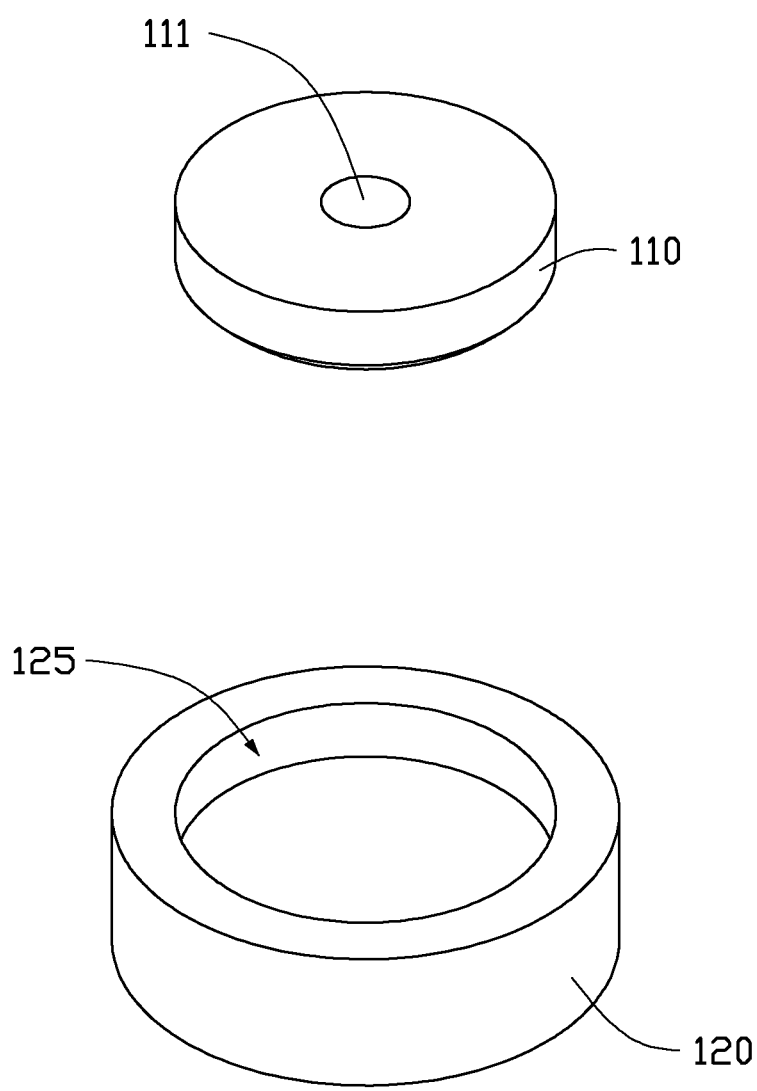
FIG. 4 is an inverted view of the lens unit of FIG. 3.
Figure 5:
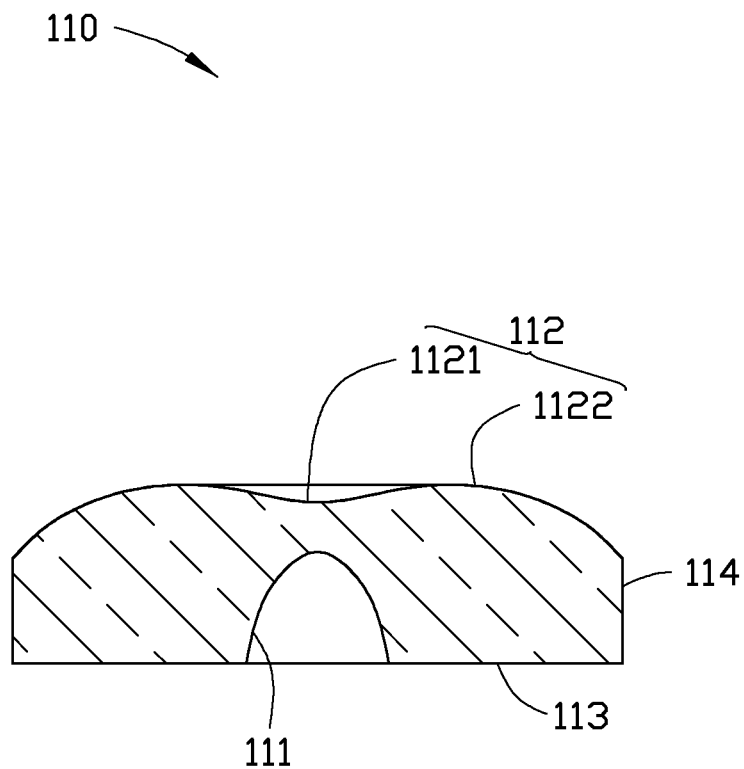
FIG. 5 is a cross-sectional view of a first lens of the lens unit of FIG. 3, taken along line V-V thereof.
Figure 6:
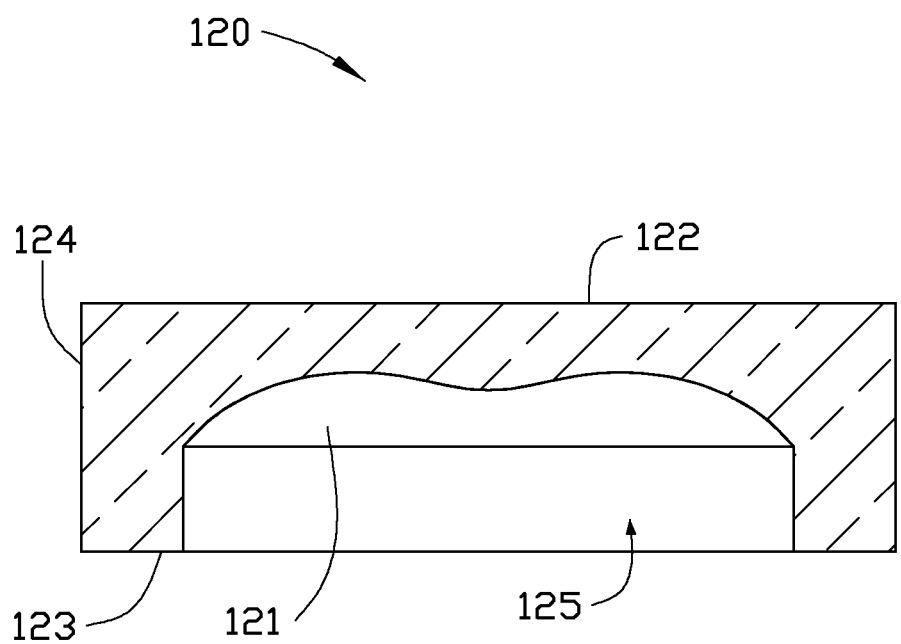
FIG. 6 is a cross-sectional view of a second lens of the lens unit of FIG. 3, taken along line VI-VI thereof.

Referring to FIGS. 1 and 2, a light source module 10 in accordance with an exemplary embodiment of the present disclosure is illustrated. The light source module 10 includes a lens unit 100 and a light source 200 received in the lens unit 100. Light emitted from the light source 200 is adjusted by the lens unit 100.

Referring also to FIGS. 3 to 6, the lens unit 100 is substantially columned, and includes a first lens 110 and a second lens 120 stacked on the first lens 110. The first lens 110 is received in the second lens 120.

The first lens 110 includes a first light input surface 111, a first light output surface 112, a first bottom surface 113 and a first side surface 114 connected to the first light input surface 111 and the first bottom surface 113. The first light input surface 111 is a curved surface depressing from a center of the first bottom surface 113 towards the first light output surface 112 of the first lens 110. The first light input surface 111 defines a cavity. In the present embodiment, the central axis of the first light input surface 111 is coaxial to that of the first lens 110. The first light input surface 111 is substantially elliptical, and the short axis of the elliptical is substantially coplanar with the first bottom surface 113, and the longer axis of the elliptical is perpendicular to the first bottom surface 113.

The first light output surface 112 is opposite to the first light input surface 111. The first light output surface 112 is an aspheric surface and includes a concave surface 1121 located at a center thereof and a convex surface 1122 located at peripheral thereof and surrounding the concave surface 1121. The concave surface 1121 is just opposite to the first light input surface 111 and is depressed towards the first light input surface 111 of the first lens 110. The concave surface 1121 is used for diverging direct light (i.e., light having a small emerging angle) emitted from the light source 200. The convex surface 1122 smoothly connects the concave surface 1121 and is used for diverging side light (i.e., light having a large emerging angle) emitted from the light source 200.

The first side surface 114 is perpendicular to the bottom surface 113. The first side surface 114 is substantially cylindrical.

The second lens 120 includes a second light input surface 121, a second light output surface 122, a second bottom surface 123 and a second side surface 124. The second bottom surface 123 is a planar annular surface. The second lens 120 defines a cavity 125 at the second bottom surface 123. The second light input surface 121 is a side surface of the cavity. In the present embodiment, the second light input surface 121 is same as a combination of the first light output surface 112 and the first side surface 114 of the first lens 110. The first lens 110 engages with the second lens 120, and the second light input surface 121 tightly contacts the first light output surface 112 and the first side surface 114 of the first lens 110. The second light output surface 122 is a planar circular surface and parallel to the second bottom surface 123. The second side surface 124 is substantially cylindrical.

In the present embodiment, the first lens 110 is made of glass, and has a first refractive index. The second lens 120 is made of polymethyl methacrylate (PMMA), and has a second refractive index which is less than the first refractive index of the first lens 110, such as the first refractive index of the first lens is 1.8, and the second refractive index of the second lens is 1.5.

The first lens 110 is received in the cavity 125 of the second lens 120. The second light input surface 121 of the second lens 120 tightly contacts the first light output surface 112 and the first side surface 114 of the first lens 110. The second bottom surface 123 is substantially coplanar with the first bottom surface 113.

The light source 200 faces the first light input surface 110 of the lens 110 and is received in the cavity defined by the first light input surface 110. In the present embodiment, a bottom surface of the light source 200 is coplanar with the first bottom surface 113 of the first lens 110. The light source 200 is an LED, and the central axis of the LED is coaxial to that of the first lens 110.

Referring to FIG. 2 again, light beams emitted from the light source 200 enter the first lens 110 via the first light input surface 111, part of the light beams are refracted and diverged by the concave surface 1121 of the first lens 110 to the second lens 120. The other parts of light beams emitted from the light source 200 enter the second lens 120 via the convex surface 1122 of the first lens 110. The light beams are further diverged by the second lens 120 to radiate to the outside environment. Since the second refractive index of the second lens 120 is less than the first refractive index of the first lens 110, light total reflection at peripheral surfaces (such as the second light output surface 122) of the lens unit 100 are reduced; therefore, it can improve the light extractive efficiency of the lens unit 100. Furthermore, light beams emitted from the light source 200 are reflected and diverged by the first lens 110 and the second lens 120, and the radiation angle of the light source module 10 is increased.

It is to be further understood that even though numerous characteristics and advantages have been set forth in the foregoing description of embodiments, together with details of the structures and functions of the embodiments, the disclosure is illustrative only; and that changes may be made in detail, especially in matters of shape, size, and arrangement of parts within the principles of the disclosure to the full extent indicated by the broad general meaning of the terms in which the appended claims are expressed.

What is claimed is:

1. A lens unit used for adjusting light emitted from a light source that emits dispersed light beams, the lens unit comprising:
    a first lens comprising a first light input surface, a first light output surface opposite to the first light input surface and a first side surface connected to the first light output surface, the first light output surface being an aspheric surface, the first lens having a first refractive index; and
    a second lens comprising a second light input surface and a second light output surface opposite to the second light input surface, the second lens defining a cavity at the second light input surface, the first lens being received in the cavity, and the second light input surface contacting the first light output surface and the first side surface of the first lens, the second lens having a second refractive index which less than the first refractive index;
    wherein the first light input surface of the first lens defines a cavity, the light source is received in the cavity defined by the first light input surface and is spaced from an inner surface of the cavity defined by the first light input surface; and
    wherein the dispersed light beams emitted from the light source directly enter the first lens, and then are sequentially diverged by the first lens and the second lens before emerging outside.

2. The lens unit of claim 1, wherein the first lens further comprises a first bottom surface, the first light input surface depressing from a center of the first bottom surface towards the first light output surface of the first lens, the first side surface connected to the first light output surface and the first bottom surface.

3. The lens unit of claim 1, wherein the first light output surface of the first lens comprises a concave surface located at a center thereof and a convex surface surrounding the concave surface.

4. The lens unit of claim 1, wherein the first light input surface is an elliptic sphere surface.

5. The lens unit of claim 1, wherein a central axis of the first light input surface of the first lens is coaxial to that of the first lens.

6. The lens unit of claim 2, wherein the second lens comprises a second bottom surface substantially coplanar with the first bottom surface of the first lens.

7. The lens unit of claim 1, wherein the first lens is made of glass, and the second lens is made of polymethyl methacrylate.

8. A light source module comprising:
    a light source that emits dispersed light beams; and
    a lens unit, the lens unit comprising:
    a first lens comprising a first light input surface, a first light output surface opposite to the first light input surface and a first side surface connected to the first light output surface, the first light output surface being an aspheric surface, the first lens having a first refractive index, the light source facing the first light input surface; and
    a second lens comprising a second light input surface and a second light output surface opposite to the second light input surface, the second lens defining a cavity at the second light input surface, the first lens being received in the cavity, and the second light output surface contacting the first light output surface and the first side surface of the first lens, the second lens having a second refractive index which is less than the first refractive index;
    wherein the first light input surface of the first lens defines a cavity, the light source is received in the cavity defined by the first light input surface and is spaced from an inner surface of the cavity defined by the first light input surface; and
    wherein the dispersed light beams emitted from the light source directly enter the first lens, and then are sequentially diverged by the first lens and the second lens before emerging outside.

9. The lens unit of claim 8, wherein the light source is an LED, and a central axis of the LED is coaxial to that of the first lens.

10. The lens unit of claim 8, wherein the first lens further comprises a first bottom surface, the first light input surface depressing from a center of the first bottom surface towards the first light output surface of the first lens, the first side surface connected to the first light output surface and the first bottom surface.

11. The lens unit of claim 8, wherein the first light output surface of the first lens comprises a concave surface located at a center thereof and a convex surface surrounding the concave surface.

12. The lens unit of claim 8, wherein the first light input surface is an elliptic sphere surface.

13. The lens unit of claim 8, wherein a central axis of the first light input surface of the first lens is coaxial to that of the first lens.

14. The lens unit of claim 10, wherein the second lens comprises a second bottom face substantially coplanar with the first bottom surface of the first lens.

15. The lens unit of claim 2, wherein a bottom surface of the light source is coplanar with the first bottom surface of the first lens.

16. The lens unit of claim 10, wherein a bottom surface of the light source is coplanar with the first bottom surface of the first lens.

* * * * *